United States Patent
Wang He

(10) Patent No.: US 9,182,099 B2
(45) Date of Patent: Nov. 10, 2015

(54) LENS AND LED LIGHT MODULE HAVING THE SAME

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 202 days.

(21) Appl. No.: 14/056,972

(22) Filed: Oct. 18, 2013

(65) Prior Publication Data

US 2014/0293614 A1 Oct. 2, 2014

(30) Foreign Application Priority Data

Mar. 27, 2013 (TW) .............................. 102110785 A

(51) Int. Cl.
| | |
|---|---|
| *F21V 5/04* | (2006.01) |
| *G02B 19/00* | (2006.01) |
| *F21V 5/00* | (2015.01) |
| *F21Y 101/02* | (2006.01) |

(52) U.S. Cl.
CPC .............. *F21V 5/04* (2013.01); *G02B 19/0023* (2013.01); *G02B 19/0061* (2013.01); *G02B 19/0071* (2013.01); *F21V 5/008* (2013.01); *F21Y 2101/02* (2013.01)

(58) Field of Classification Search
CPC ....... F21V 5/008; F21V 5/04; F21Y 2101/02; G02B 19/0023; G02B 19/0061; G02B 19/0071
USPC .............................................. 362/268, 311.02
See application file for complete search history.

(56) References Cited

U.S. PATENT DOCUMENTS

| | | | | |
|---|---|---|---|---|
| 6,296,376 | B1 * | 10/2001 | Kondo et al. ................. | 362/310 |
| 8,220,974 | B2 * | 7/2012 | Chen et al. ................... | 362/326 |
| 8,506,123 | B2 * | 8/2013 | Lee et al. ..................... | 362/268 |
| 2015/0116984 | A1 * | 4/2015 | Dai et al. ..................... | 362/97.1 |

* cited by examiner

*Primary Examiner* — Stephen F Husar
(74) *Attorney, Agent, or Firm* — Novak Druce Connolly Bove + Quigg LLP

(57) ABSTRACT

A lens, which is integrally formed as a single piece, includes a base, a first light diffusion portion and a second light diffusion portion formed on the base. A receiving hole is defined in the second light diffusion portion. The first light diffusion portion is received in the receiving hole, and an inner surface of the receiving hole is spaced from a top surface and a periphery side surface of the first light diffusion portion. A recess is defined in the first light diffusion portion for receiving an LED therein. The first and second light diffusion portions have different light diffusion (refraction) capabilities. The present disclosure also relates an LED light module using the lens.

20 Claims, 5 Drawing Sheets

LENS AND LED LIGHT MODULE HAVING THE SAME

BACKGROUND

1. Technical Field

The disclosure generally relates to light sources, and particularly, to an LED light source having a lens with a first light diffusion portion and a second light diffusion portion formed as a single piece to uniformly diffuse light from an LED over a large angle of illumination.

2. Description of Related Art

A conventional light emitting diode (LED) package includes a substrate, a first electrode and a second electrode arranged on a top surface of the substrate, one light emitting diode mounted on the substrate and electrically connecting with the first and second electrodes respectively.

However, each LED package generates a smooth round light field, and the light emitted from the LED package is mainly concentrated at a center thereof. The light at a periphery of the LED package is relatively poor to illuminate. Therefore, the light emitted from the LED packages can not be uniformly emitted out. When this happens, the performance of the LED package will be unfavorably affected, particularly when the LED package is used as a light source for a planar illumination such a backlight module for an LCD (liquid crystal display).

What is needed, therefore, is a lens and an LED light module having the lens which can overcome the described-above shortcomings.

DETAILED DESCRIPTION

An exemplary embodiment of an LED light module 1 in accordance with the present disclosure will now be described in detail below and with reference to the drawings.

Figure 1:
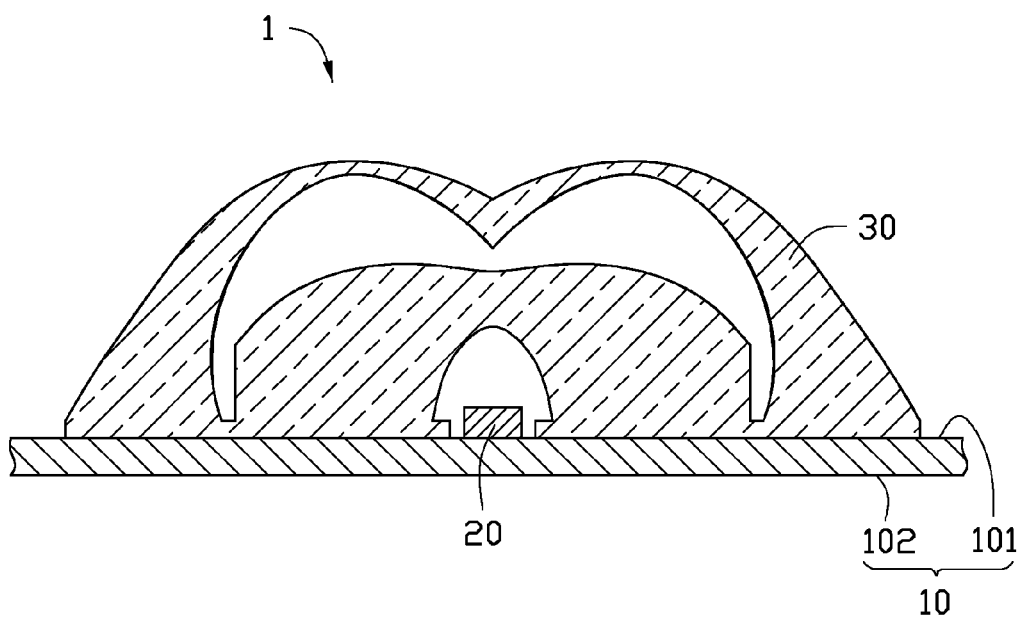
FIG. 1 is a cross-sectional view of an LED light module in accordance with an exemplary embodiment of the present disclosure.

Referring to FIG. 1, the LED light module 1 includes a substrate 10, a light emitting diode (LED) 20 mounted on the substrate 10, and a lens 30 located on the substrate 10 and covering the light emitting diode 20 therein. The LED light module 1 is mainly used as a light source for a backlight module for a planar display such as a liquid crystal display (LCD). The LED 20 may include an LED chip and an encapsulation enclosing the LED chip therein, wherein the encapsulation may include fluorescent particles distributed therein for converting color (for example, blue) of light from the LED chip to a desired color (for example, white).

The substrate 10 is a flat plate, and is made of electrically insulating materials, such as ceramics, Si (silicon), sapphire, or SiC (silicon carbide).

The substrate 10 includes a top surface 101 and a bottom surface 102 opposite and parallel to the top surface 101. A circuit (not shown) is arranged on the top surface 101 of the substrate 10. In this embodiment, the LED 20 is located on the top surface 101 of the substrate 10, and electrically connects with the circuit on the top surface 101 of the substrate 10.

Figure 2:
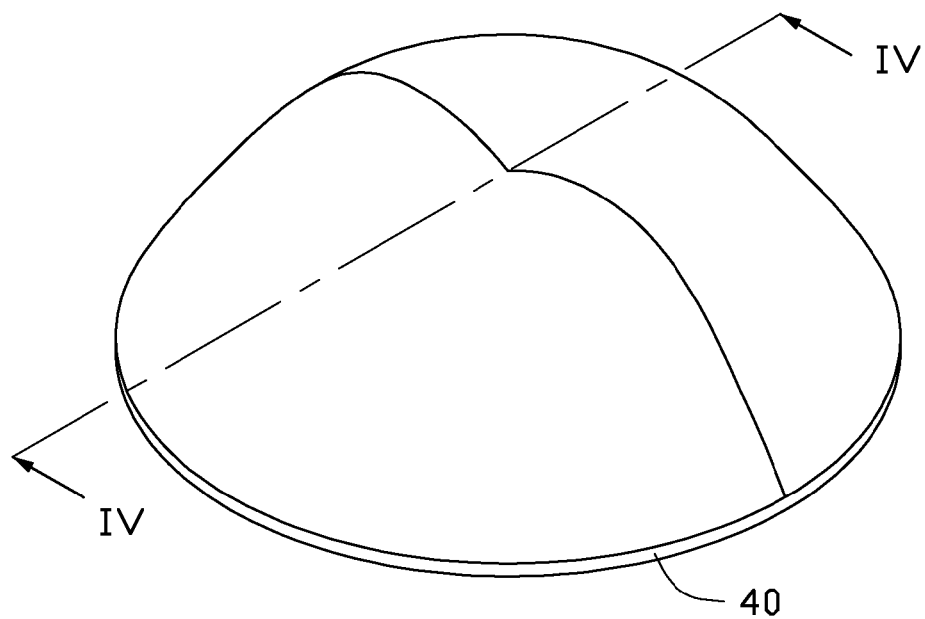
FIG. 2 is a perspective view of a lens of the LED light module of FIG. 1.
Figure 3:
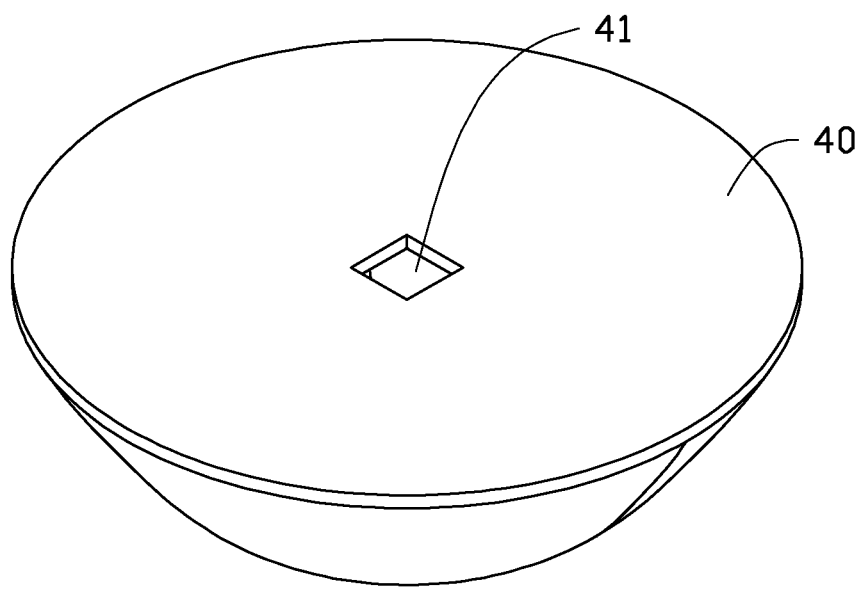
FIG. 3 is an inverted view of the lens of FIG. 2.
Figure 4:
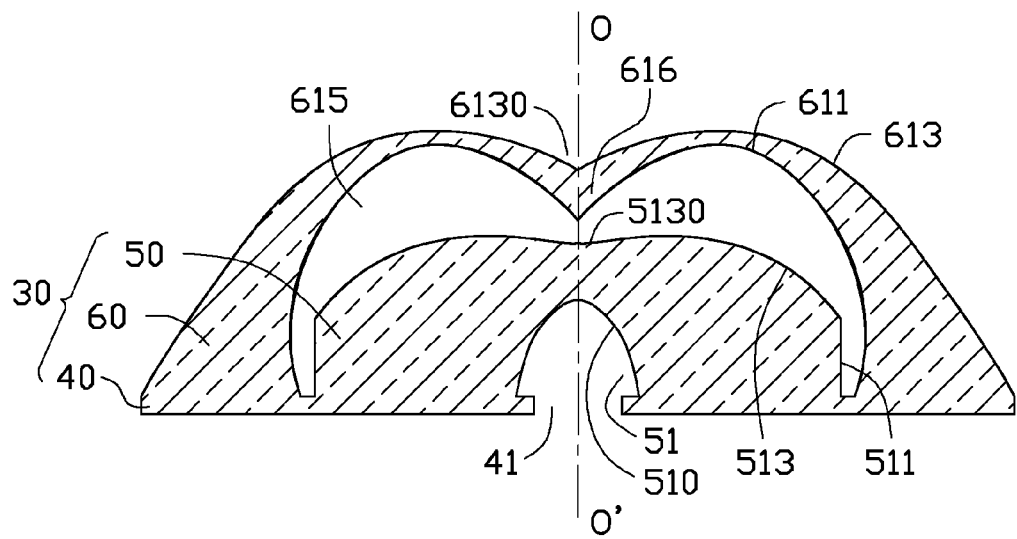
FIG. 4 is a cross-sectional view of the lens of FIG. 2, taken along line IV-IV thereof.

Referring to FIGS. 2-4, the lens 30 is centrosymmetric about a central axis O-O' thereof, and the lens 30 includes a supporting base 40, a first light diffusion portion 50 and a second light diffusion portion 60 formed on the supporting base 40. The first light diffusion portion 50 is located at a central portion of a top surface of the supporting base 40. The second light diffusion portion 60 is located at a peripheral portion of the top surface of the supporting base 40 and receives the first light diffusion portion 50 therein. The second light diffusion portion 60 is spaced from the first light diffusion portion 50. In this embodiment, the first light diffusion portion 50 and the second light diffusion portion 60 are formed with the supporting base 40 as a single piece, whereby the relative position between the first and second light diffusion portions 50, 60 will be fixed and not easily altered. Thus, the assembling error when the first and second light diffusion portions are made as two individual pieces can be avoided in the present disclosure, whereby the first and second light diffusion portions 50, 60 of the present disclosure can more accurately perform their respective light diffusion functions as required.

The supporting base 40 is a circular plate with a uniform thickness, and is centrosymmetrical about the central axis O-O'. A through hole 41 is defined in a center of the supporting base 40. The through hole 41 passes through the supporting base 40 along a thickness direction thereof. In this embodiment, the through hole 41 is rectangular. Alternatively, the through hole 41 may be circular.

The first light diffusion portion 50 extends upwardly and vertically from the central portion of the supporting base 40. The first light diffusion portion 50 is substantially cylindrical. A width of the first light diffusion portion 50 along a horizontal direction of the lens 30 is less than a width of the supporting base 40, such that a cross section of the supporting base 40 with the first light diffusion portion 50 has an inverted T shape configuration. In this embodiment, the first light diffusion portion 50 is centrosymmetric about the central axis O-O'.

The first light diffusion portion 50 includes an annular side surface 511 extending vertically from the top surface of the supporting base 40 and a top surface 513 extending upwardly and radially inward from a top of the annular side surface 511. In this embodiment, the top surface 513 of the first light diffusion portion 50 extends upwardly and radially inward to a highest point thereof, and then extends from the highest point downwardly and radially inward toward the central axis O-O' to be converged at a point. Such that, a first cavity 5130 is defined at a central portion of the top surface 513 of the first light diffusion portion 50. The first cavity 5130 is funnel shaped, and extends downwardly along the central axis O-O'. Light emitting through the first cavity 5130 is diffused by the top surface 513 defining the first cavity 5130 to emit out of the first light diffusion portion 50 divergently.

A recess 51 is defined in a bottom of the first light diffusion portion 50. The recess 51 communicates with and is aligned with the through hole 41. The recess 51 is recessed upwardly along a direction from a bottom surface of the first light diffusion portion 50 towards the top surface 513 of the first light diffusion portion 50. The recess 51 is arc-shaped in a vertical cross section, and a cross section of the recess 51 along a horizontal direction of the first light diffusion portion 50 is circular. An inner diameter of the recess 51 gradually decreases along a direction from the bottom surface of the first light diffusion portion 50 toward the top surface 513 of the first light diffusion portion 50. The inner diameter of an opening end of the recess 51 is larger than a width of the through hole 41, such that a cross section of the recess 51 and the through hole 41 through the central axis O-O' has a mushroomed configuration. In this embodiment, a height of the recess 51 is larger than a height of the annular side surface 511 of the first light diffusion portion 50. An inner surface of the recess 51 is a smooth surface. Alternatively, the inner surface of the recess 51 may be a roughed surface to diffuse light emitting through the recess 51.

The recess 51 and the through hole 41 of the supporting base 40 receives the LED 20 therein, wherein an inner surface of the lens 30 defining the through hole 41 and the inner surface 510 defining the recess 51 are spaced from the LED 20. A height of the through hole 41 is less than a thickness of the LED 20, such that, a top surface of the LED 20 is above the through hole 41 and faces towards the inner surface 510 of the recess 51.

The inner surface 510 of the recess 51 is a first light incident surface of the first light diffusion portion 50, and the annular side surface 511 and the top surface 513 are the first light output surface of the first light diffusion portion 50. The first light incident surface of the first light diffusion portion 50 has a different curvature from the first output surface of the first light diffusion portion 50. Such that, light emitting through first light incident surface and first light output surface is diffused (refracted) in different degrees, whereby the light is emitted out from the first light diffusion portion 50 divergently and uniformly. In this embodiment, a curvature of the first light incident surface of the first light diffusion portion 50 is larger than a curvature of the top surface 513 of the first light output surface of the first light diffusion portion 50.

The second light diffusion portion 60 is substantially inverted bowl-shaped, and is centrosymmetric about the central axis O-O'. An outer diameter of the second light diffusion portion 60 gradually decreases along a direction from a bottom end thereof connecting with the supporting base 40 toward a top end thereof far away from the supporting base 40.

The second light diffusion portion 60 includes an inner surface 611 and an outer surface 613 both extending upwardly from the top surface of the supporting base 40. The inner surface 613 extends upwardly from the top surface of the supporting base 40 to define a receiving space 615 therein. The first light diffusion portion 50 is received in the receiving space 615 of the second light diffusion portion 60, and the inner surface 611 of the second light diffusion portion 60 is spaced from the annular side surface 511 and the top surface 513 of the first light diffusion portion 50. In this embodiment, the inner surface 611 is a smooth surface, and a vertical cross section of the receiving space 615 through the central axis O-O' has a substantially M shaped configuration.

The outer surface 613 extends upwardly and radially inward to a highest point thereof relative to the top surface of the supporting base 40, and then extends from the highest point downwardly and radially inward toward the central axis O-O' to be converged at a point. Such that, a second cavity 6130 is defined in a central portion of the outer surface 613 of the second light diffusion portion 60. In this embodiment, the second cavity 6130 is aligned with the first cavity 5130 of the first light diffusion portion 55. In this embodiment, a sharp tip 616 is formed at a center of the inner surface 611 of the second light diffusion portion 60, which is pointed toward the first cavity 5130 of the first light diffusion portion 50.

A thickness of the second light diffusion portion 60 gradually decreases to a minimum thickness along a direction from the bottom end of the second light diffusion portion 60 toward the top end thereof, and then gradually increases along a direction from the top end toward the central axis O-O'.

The inner surface 611 is the second light incident surface of the second light diffusion portion 60, and the outer surface 613 is the second light output surface of the second light diffusion portion 60. The second light incident surface has a curvature different from a curvature of the second light output surface, such that, light emitting through the second light diffusion portion 60 is diffused by the second light incident/output surface in different degrees, whereby the light is emitted out of the second light diffusion portion 60 divergently and uniformly. In this embodiment, the curvature of the second light output surface is less than the curvature of the second light incident surface.

Referring to FIG. 1, when the LED light module 1 is assembled, the LED 20 is received in the through hole 41 of the supporting base 40 and partly received in the recess 51. A center of the LED 20 is aligned with centers of the recess 51 and the first cavity 5130 of the first light diffusion portion 50, and is also aligned with a center of the second cavity 6130 along the central axis O-O'.

Figure 5:
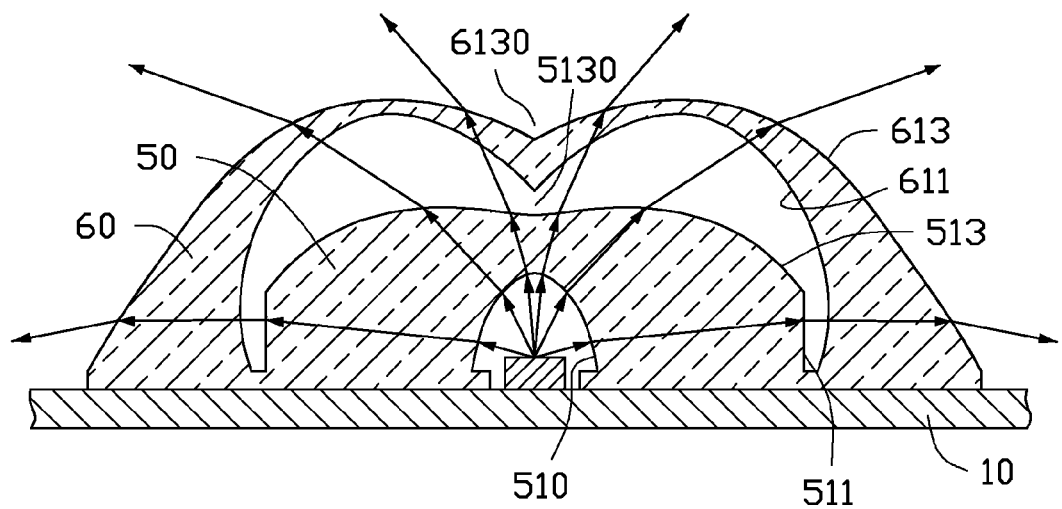
FIG. 5 shows light paths of a light emitting diode of the LED light module through the lens of FIG. 1.

Referring to FIG. 5, when the LED light module 1 works, light emitted from the LED 20 travels into the first light diffusion portion 50 from the first light incident surface of the first light diffusion portion 50, and then, the light emits out of the first light diffusion 50 from the first light output surface towards the second light incident surface of the second light diffusion portion 60.

The light travels into the second light diffusion portion 60 from the second light incident surface, and then radiates out of the second light diffusion portion 60 from the second light output surface.

According to the LED light module 1 of the present disclosure, because the light emitted from the LED 20 is sequentially diffused by the first light incident surface and the first light output surface of the first light diffusion portion 50, and the second light incident surface and the second light output surface of the second light diffusion portion 60, a range of illumination of the LED light module 1 becomes wider.

Besides, because the curvature of the first light incident surface is larger than the curvature of the top surface 513 of the first light output surface, and the curvature of the second light incident surface of the second light diffusion portion 60 is larger than the curvature of the second light output surface of the second light diffusion portion 60, when the light sequentially emits through the first light incident surface, the first light output surface, the second light incident surface and the second light output surface, the light is divergently diffused in different degrees, which makes the light from the LED light module 1 be more divergently and uniformly distributed.

Furthermore, because a central light with a high light intensity of the LED 20 is sequentially diffused by the top surface 513 defining the first cavity 5130 and the outer surface 613 defining the second cavity 6130 to peripheral sides of the central axis O-O' of the first and second light diffusion portions 50, 60, the light emitted from the LED light module 1 becomes more uniform.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A lens for diffusing light from an LED (light emitting diode), comprising:

a supporting base;
a first light diffusion portion formed on the supporting base; and
a second light diffusion portion formed on the supporting base, wherein the supporting base, the first light diffusion portion and the second light diffusion portion are formed as a single piece;
wherein a receiving space is defined in the second light diffusion portion, the first light diffusion portion being received in receiving space of the second light diffusion portion, an inner surface of the second light diffusion portion defining the receiving space being spaced from the first light diffusion portion, a recess being defined in the first light diffusion portion and configured to receive the LED therein.

2. The lens of claim 1, wherein the first light diffusion portion comprises a first light incident surface and a first light output surface, and a curvature of the first light incident surface is larger than a curvature of a top portion of the first light output surface.

3. The lens of claim 2, wherein the first light diffusion portion comprises an annular side surface extending upwardly from the supporting base, and a top surface extending upwardly and inwards from a top of the annular side surface, an inner surface of the recess of the first light diffusion portion is the first light incident surface of the first light diffusion portion, and the annular side surface and the top surface are the first light output surface of the first light diffusion portion.

4. The lens of claim 1, wherein the first light diffusion portion comprises an annular side surface extending upwardly from the supporting base, and a top surface extending upwardly and inward from a top of the annular side surface, and the inner surface of the receiving space is spaced from the annular side surface and the top surface.

5. The lens of claim 4, wherein the top surface of the first light diffusion portion extends from the top of the annular side surface upwardly and radially inward to a highest point thereof, and then extends from the highest point thereof downwardly and radially inward toward a central axis of the first light diffusion portion to be converged at a point on the central axis.

6. The lens of claim 5, wherein a first cavity is defined in a central portion of the top surface of the first light diffusion portion.

7. The lens of claim 6, wherein the first cavity is funnel shaped, and extends downwardly along the central axis of the first light diffusion portion.

8. The lens of claim 1, wherein a central axis of the first light diffusion portion coincides with a central axis of the second light diffusion portion.

9. The lens of claim 1, wherein a cross section of the receiving space through a central axis has a substantially M shaped configuration.

10. The lens of claim 2, wherein the second light diffusion portion comprises a second light incident surface facing towards the first light output surface and a second light output surface far away from the first light output surface of the first light diffusion portion, and a curvature of the second light incident surface is larger than a curvature of the second light output surface of the second light diffusion portion.

11. The lens of claim 10, wherein the second light diffusion portion further comprises an outer surface extending from the supporting base, the inner surface of the receiving space is the second light incident surface, and the outer surface is the second light output surface.

12. The lens of claim 11, wherein the outer surface of the second light diffusion portion extends from the supporting base upwardly and radially inward to a highest point thereof, and then extends from the highest point thereof downwardly and radially inward to a central axis of the second light diffusion portion.

13. The lens of claim 12, wherein a second cavity is defined in a central portion of the outer surface of the second light diffusion portion.

14. The lens of claim 13, wherein the second cavity is funnel shaped.

15. The lens of claim 1, wherein a through hole is defined in a center of the supporting base, and the through hole passes through the supporting base along a thickness direction thereof to communicate with the recess.

16. The lens of claim 15, wherein the through hole communicates with and is aligned with the recess of the first light diffusion portion, and an inner diameter of a bottom end of the recess is larger than a width of the through hole.

17. The lens of claim 16, wherein the inner diameter of the recess of the first light diffusion portion gradually decreases from the bottom end to a top end thereof, and a vertical cross section of the through hole and the recess in combination has a substantially mushroomed configuration.

18. The lens of claim 3, wherein the recess is recessed upwardly along a direction from the supporting base toward the top surface of the light diffusion portion, and a height of the recess is larger than a height of the annular side surface of the first light diffusion portion.

19. An LED light module, comprising:
a substrate comprising a top surface and a bottom surface opposite and parallel to the top surface;
a circuit mounted on the top surface of the substrate;
an LED mounted on the substrate and electrically connecting with the circuit; and
a lens located on the top surface of the substrate and covering the LED therein;
wherein the lens comprises a supporting base, a first light diffusion portion and a second light diffusion portion formed on the supporting base, a receiving space being defined in the second light diffusion portion, the first light diffusion being received in receiving space of the second light diffusion portion, an inner surface of the receiving space being spaced from the first light diffusion portion, a recess being defined in the first light diffusion portion to receive the LED therein, and the first light diffusion portion and the second light diffusion being formed with the supporting base as a single piece.

20. The LED light module of claim 19, wherein a through hole is defined in a center of the supporting base, the through hole communicates with and is aligned with the recess of the first light diffusion portion to receives the LED therein, the LED is received in the through hole, and a top surface of the LED faces toward an inner surface of the recess.

* * * * *